US012103680B2

(12) United States Patent
Saika et al.

(10) Patent No.: US 12,103,680 B2
(45) Date of Patent: Oct. 1, 2024

(54) REMOVABLE BATTERY WITH A PULL-BAR TO REMOVE THE BATTERY FROM A CHASSIS

(71) Applicant: GoPro, Inc., San Mateo, CA (US)

(72) Inventors: Noriaki Saika, Foster City, CA (US); William H. Tolbert, San Mateo, CA (US); Reza Yazdani, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 754 days.

(21) Appl. No.: 17/130,911

(22) Filed: Dec. 22, 2020

(65) Prior Publication Data

US 2021/0171199 A1    Jun. 10, 2021

Related U.S. Application Data

(63) Continuation of application No. 16/412,775, filed on May 15, 2019, now Pat. No. 10,906,642, which is a (Continued)

(51) Int. Cl.
*B64C 39/02*    (2023.01)
*B64U 10/13*    (2023.01)
(Continued)

(52) U.S. Cl.
CPC .......... *B64C 39/024* (2013.01); *B64U 20/80* (2023.01); *H01M 50/249* (2021.01); *B64U 10/13* (2023.01);
(Continued)

(58) Field of Classification Search
CPC .......................................... H01M 50/244–269
See application file for complete search history.

(56) References Cited

U.S. PATENT DOCUMENTS 1,472,997 A * 11/1923 Stevenson ........... H01M 50/256
16/DIG. 15
2,911,050 A    11/1959 Scott
(Continued)

FOREIGN PATENT DOCUMENTS

EP      0933291 A1 *  8/1999
FR    2880735 A1 *  7/2006 .......... H01M 2/1016
(Continued)

OTHER PUBLICATIONS

Machine Translation of EP 0933291 A1 (Oct. 4, 2023) (Year: 2023).*
(Continued)

*Primary Examiner* — Matthew J Merkling
(74) *Attorney, Agent, or Firm* — Young Basile Hanlon & MacFarlane, P.C.

(57) ABSTRACT

Disclosed is an aerial vehicle. The aerial vehicle may include a removable battery. Various embodiments of removable battery assemblies include a pull-bar battery assembly, a latch battery assembly, and a lever battery assembly. The aerial vehicle may also include a propeller locking mechanism to which propellers may be removably coupled. The propeller locking mechanism may obviate the need for tools for coupling or decoupling propellers to the aerial vehicle. Vents in the arm of the aerial vehicle may provide an air pathway, providing convective cooling for the electronics aerial vehicle.

20 Claims, 10 Drawing Sheets

Related U.S. Application Data continuation of application No. 15/197,596, filed on Jun. 29, 2016, now Pat. No. 10,336,451.

(60) Provisional application No. 62/187,205, filed on Jun. 30, 2015.

(51) Int. Cl.
| | |
|---|---|
| *B64U 20/80* | (2023.01) |
| *B64U 30/20* | (2023.01) |
| *B64U 50/19* | (2023.01) |
| *B64U 101/30* | (2023.01) |
| *F16D 1/10* | (2006.01) |
| *H01M 50/249* | (2021.01) |

(52) U.S. Cl.
CPC .............. *B64U 30/20* (2023.01); *B64U 50/19* (2023.01); *B64U 2101/30* (2023.01); *F16D 2001/103* (2013.01)

(56) References Cited

U.S. PATENT DOCUMENTS

| | | | | |
|---|---|---|---|---|
| 4,448,863 | A | * | 5/1984 | Terrell ................ H01M 50/256 |
| | | | | 429/178 |
| 5,340,279 | A | | 8/1994 | Cycon |
| 5,351,913 | A | | 10/1994 | Cycon |
| 6,382,556 | B1 | | 5/2002 | Pham |
| 6,609,892 | B1 | | 8/2003 | Kreul |
| 8,535,191 | B1 | | 9/2013 | Gall |
| 9,409,642 | B1 | | 8/2016 | Pingree |
| 9,434,267 | B2 | | 9/2016 | Wang |
| 10,336,451 | B2 | | 7/2019 | Saika |
| 10,625,613 | B2 | | 4/2020 | Zhao |
| 10,906,642 | B2 | | 2/2021 | Saika |
| 2003/0066932 | A1 | * | 4/2003 | Carroll ................ B64C 39/028 |
| | | | | 244/120 |
| 2004/0144580 | A1 | * | 7/2004 | Wu ...................... H01M 50/249 |
| | | | | 180/68.5 |
| 2004/0197648 | A1 | * | 10/2004 | Sciutto ............... H01M 50/256 |
| | | | | 429/400 |
| 2005/0077873 | A1 | * | 4/2005 | Watson ............... H01M 50/296 |
| | | | | 320/114 |
| 2007/0082259 | A1 | * | 4/2007 | Lin ..................... H01M 50/244 |
| | | | | 429/97 |
| 2009/0134273 | A1 | * | 5/2009 | Page ...................... B64U 20/75 |
| | | | | 244/63 |
| 2016/0176520 | A1 | | 6/2016 | Goldstein |
| 2016/0221671 | A1 | | 8/2016 | Fisher |
| 2016/0347441 | A1 | | 12/2016 | Wainfan |
| 2017/0001721 | A1 | | 1/2017 | Saika |
| 2017/0297738 | A1 | | 10/2017 | Von Flotow |
| 2017/0305542 | A1 | | 10/2017 | Zhang |
| 2019/0344889 | A1 | | 11/2019 | Saika |

FOREIGN PATENT DOCUMENTS

| | | | | |
|---|---|---|---|---|
| GB | 2432878 A | * | 6/2007 | .......... H01M 2/1083 |
| GB | 2550916 A | | 12/2017 | |
| JP | 2772722 B2 | * | 7/1998 | |
| WO | WO-2018119739 A1 | * | 7/2018 | ............. B64D 47/00 |

OTHER PUBLICATIONS

Machine Translation of FR-2880735-A1 (Oct. 4, 2023) (Year: 2023).*

Machine Translation of JP 2772722 B2 (Jan. 31, 2024) (Year: 2024).*

* cited by examiner

REMOVABLE BATTERY WITH A PULL-BAR TO REMOVE THE BATTERY FROM A CHASSIS

CROSS REFERENCE TO RELATED APPLICATIONS

This application is a continuation of Ser. No. 16/412,775, filed May 15, 2019, which is a continuation of Ser. No. 15/197,596, filed Jun. 29, 2016, which claims the benefit of U.S. Provisional Patent Application No. 62/187,205, filed Jun. 30, 2015, the contents of which are incorporated by reference in their entirety.

TECHNICAL FIELD

The disclosure generally relates to the field of aerial vehicles and in particular to mechanical configurations for unmanned aerial vehicles.

BACKGROUND

Unmanned remote controlled aerial vehicles, such as quadcopters, continue to grow in popularity for both their commercial applications as well as recreational uses by hobbyists.

Another technology area with challenges has been power supply. Aerial vehicles are commonly powered by one or more batteries. After a battery loses its charge, a user may desire to swap out the battery, so that the aerial vehicle may continue to be flown without having to first recharge the battery. Consequently, a battery which can be removed quickly and easily is advantageous. Furthermore, some batteries swell or warp over time or when heated, which can make removal of a battery difficult.

As the popularity of aerial vehicles increases, an example area of technology that has been found susceptible to damage is assemblies for propeller blades. The propeller blades of an aerial vehicle may be susceptible to damage due to their light weight and high rate of rotation. Furthermore, due to their fragility, a user may wish to detach propellers prior to transporting the aerial vehicle. However, removing and attaching propeller blades may be time consuming or even impossible with existing aerial vehicles. Furthermore, many aerial vehicles require tools to remove propellers, which is inconvenient. Thus, it is advantageous to provide a propeller coupling assembly with easily replaceable propellers.

Additionally, during operation, processors, sensors, motors, and/or other electronics in aerial vehicles may overheat. Overheating may cause damage or cause electronics to behave sub-optimally. Aerial vehicles may need to carry heavy payloads or run computationally expensive image processing algorithms, exacerbating the overheating issue. Thus, a reliable means of cooling the aerial vehicle to offset the heat generated by the electronics may be advantageous.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
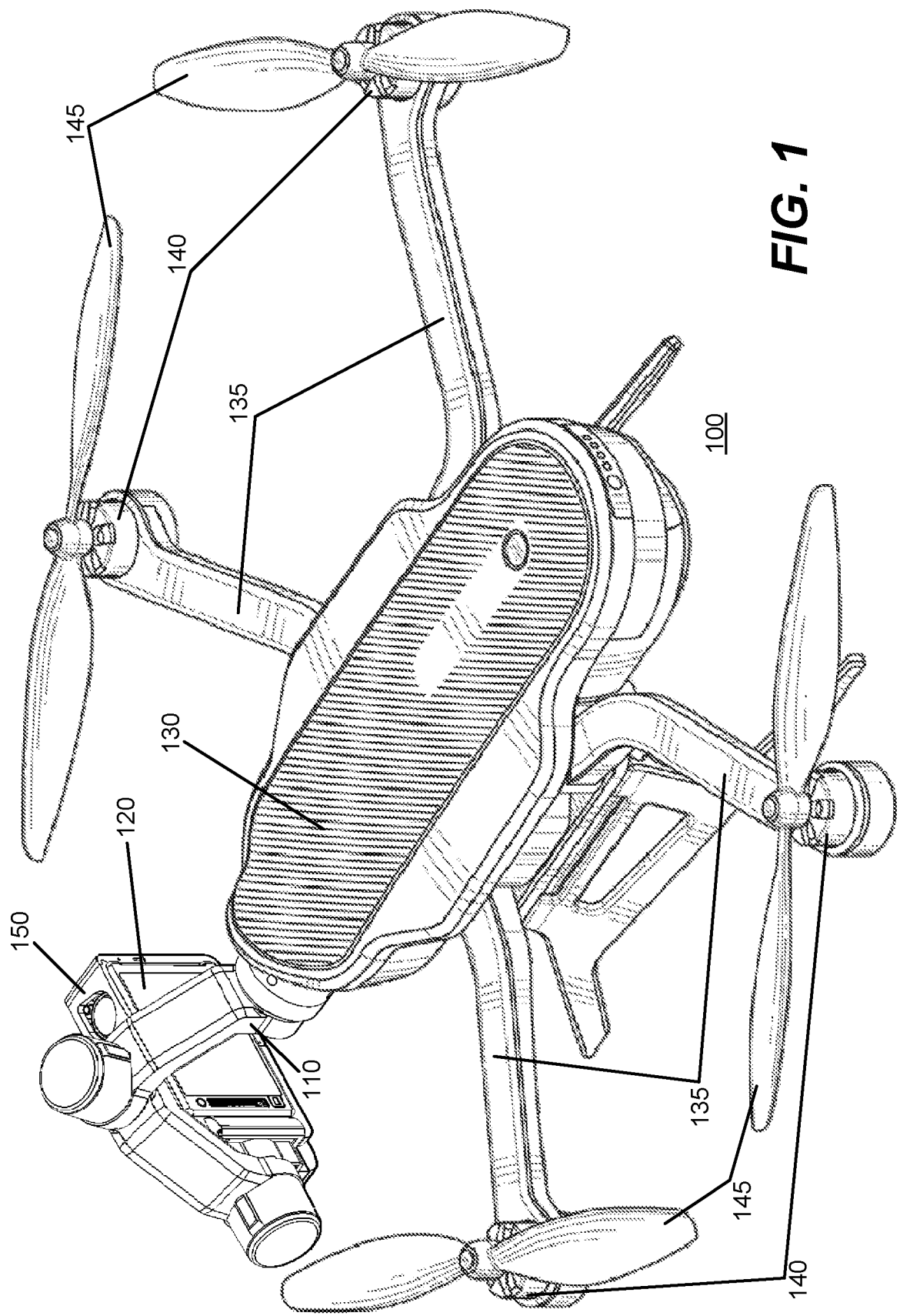
FIG. 1 is an example of a remote controlled aerial vehicle with an attached gimbal.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is a remote controlled unmanned aerial vehicle, or drone.

The aerial vehicle may include a removable battery. Various embodiments of removable battery assemblies may include a pull-bar battery assembly, a latch battery assembly, and a lever battery assembly. These various embodiments, may allow a user to attach and/or remove a battery quickly and easily. In some embodiments, the battery and/or the aerial vehicle include an element to assist a user in removing a battery that may have swollen or warped during operation of the aerial vehicle.

The aerial vehicle may include a propeller coupling assembly for coupling a propeller hub of a propeller to a propeller locking mechanism. The propeller locking mechanism may be rotated by a rotor of the aerial vehicle to rotate the propeller. The propeller locking mechanism may include a shaft, a plate, a spring, and one or more pins. The shaft may be coupled to a rotor. The plate may include an opening through which the shaft passes. The plate may have a toothed surface. The spring may encircle the shaft and may couple to the shaft and/or rotor at a first end and couple to the plate at a second end. The one or more pins may pins extend from the shaft.

The removable propeller may include a propeller hub coupled to one or more propeller blades. The propeller hub may include an aperture, one or more grooves, and one or more slots. The aperture may have a first opening at a first end of the propeller hub and a second opening at a second end of the propeller hub. The aperture may be cylindrical and the aperture may be coaxial with the shaft when the propeller locking mechanism couples to the propeller hub. The one or more grooves may each be formed in the aperture. Each groove may include a first opening at the first end of the propeller hub and a second opening at the second end of the propeller hub. The one or more grooves may be of sufficient size to allow the one or more pins of the propeller locking mechanism to pass through the grooves. The propeller hub may be a cylindrical shell, where the aperture is bounded by an internal surface of the cylindrical shell, and the one or more grooves are formed on the internal surface of the cylindrical shell. Each of the one or more grooves may rotate around an axis concentric with the aperture. The second opening of each of the one or more grooves may be directly opposite a respective one of the one or more slots. The one or more slots may be formed on the first end of the propeller hub. The propeller hub may also include a plurality of teeth extruding from the second end of the propeller hub. These teeth may reciprocally couple to the plate of the propeller locking mechanism.

When the propeller locking mechanism and the propeller hub are coupled together, each of the one or more pins of the propeller locking mechanism may fit into a corresponding slot of the one or more slots formed on the first end of the propeller hub, the aperture of the propeller hub may encircle the shaft, and the plate of the propeller locking mechanism and the second end of the second end of the propeller hub may mesh together. Also, the spring of the propeller locking mechanism may be compressed beyond its equilibrium when the propeller locking mechanism and the propeller hub are coupled together.

The aerial vehicle may also include vents in an arm of the aerial vehicle. The vents within the arm may capture airflow from around the aerial vehicle 100 and direct that airflow through one or more air pathways. The one or more air pathways may lead to components that benefit from cooling such as electrical motors, circuit boards and power sources. The cooling may allow for a decreased need in adding heat sinks to cool structures within the aerial vehicle. Moreover, this configuration also may help prolong operational use of the aerial vehicle 100 by obviating the need for additional weight from added heat sinks.

Example Aerial Vehicle Configuration

FIG. 1 illustrates an example embodiment in which the aerial vehicle 100 is a quadcopter (i.e., a helicopter with four rotors). The aerial vehicle 100 in this example may include a housing 130 for payload (e.g., electronics, storage media, and/or camera), one or more arms 135, one or more rotors 140, and one or more propellers 145. Each arm 135 may mechanically couple with a rotor 140 to create a rotary assembly. Each rotor 140 may be coupled to a respective propeller 145. When the rotors 140 are operational, all the propellers 145 may spin at appropriate speeds to allow the aerial vehicle 100 to lift (take off), land, hover, and move (forward, backward) in flight. Modulation of the power supplied to each of the rotors 140 may control the trajectory and torque on the aerial vehicle 100.

A gimbal 110 may be coupled to the housing 130 of the aerial vehicle 100 through a removable coupling mechanism that mates with a reciprocal mechanism on the aerial vehicle 100 having mechanical and communicative capabilities. The gimbal 110 may be removed from the aerial vehicle 100. In some embodiments, the gimbal 110 may also be capable of being removably attached to a variety of other mount platforms, such as a handheld grip, a vehicle, and a generic mount, which can itself be attached to a variety of platforms. In some embodiments, the gimbal 110 may be attached or removed from a platform without the use of tools.

The gimbal 110 may be a 3-axis gimbal 110 with three motors, each corresponding to a respective axis. The gimbal 110 may be configured to allow for rotation of an object, such as a camera 120, about an axis within an x-y-z Cartesian coordinate system. The gimbal 110 may couple to a camera frame 150 that couples to a camera 120. The gimbal 110 and the camera frame 150 may form a mounting structure and when coupled together the entire assembly may be referenced as a gimbal 110 for ease of discussion. The camera frame 150 may be configured to allow the camera 120 to detachably couple (e.g., attach) to it and may include electrical connection points for the coupled camera 120. The gimbal 110 may allow for the camera frame 150 to maintain a particular position and/or orientation so that the camera 120 mounted to it may remain steady as the aerial vehicle 100 is in flight. In some embodiments, the camera frame 150 may be integrated into the gimbal 110 as a camera mount. In some embodiments, the camera frame 150 may be omitted and the gimbal 110 may couple electronically and mechanically to the camera 120.

Remote Controlled Aerial Vehicle

Figure 2:
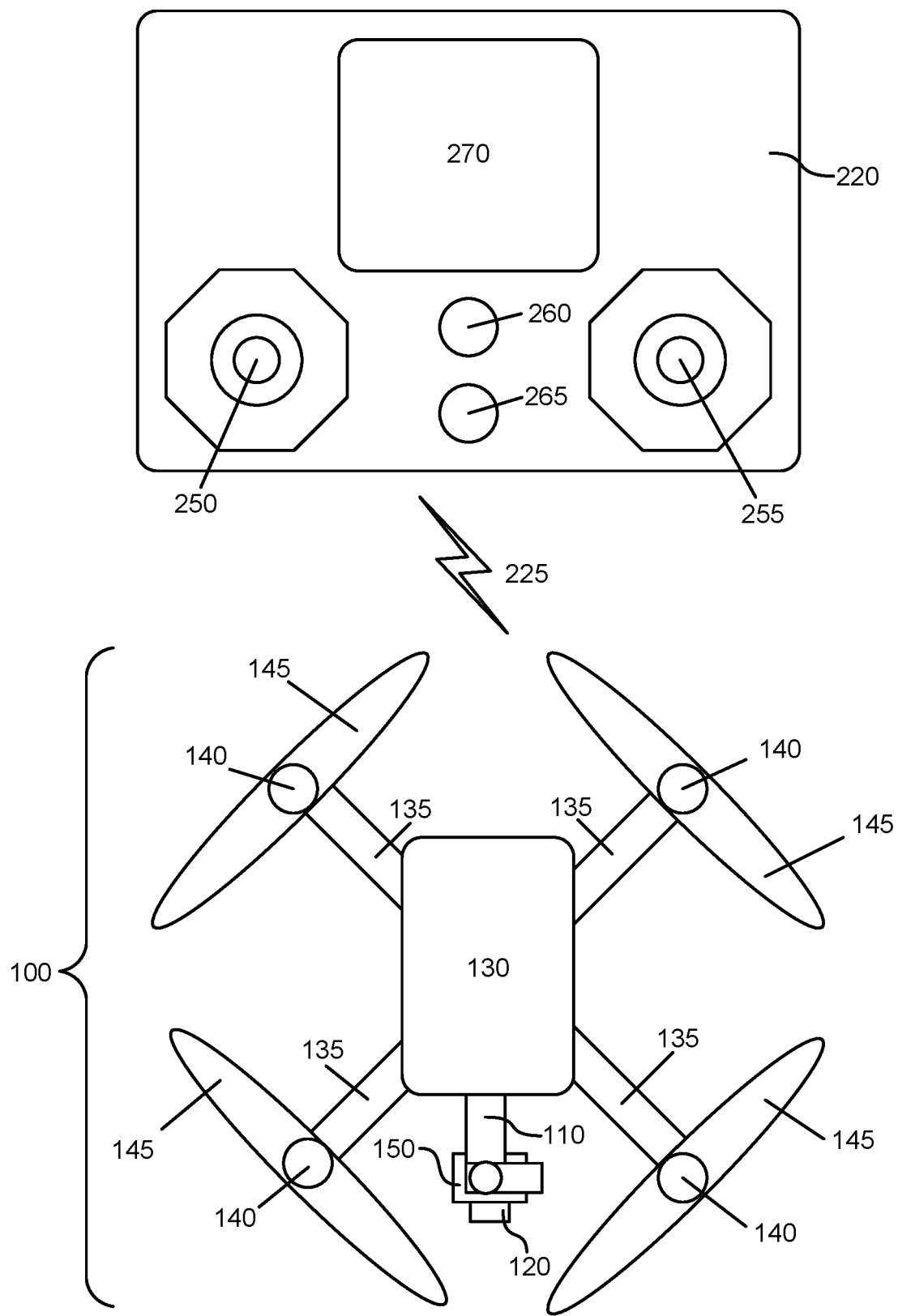
FIG. 2 illustrates an example configuration of a remote controlled aerial vehicle in communication with a remote controller.

FIG. 2 illustrates an aerial vehicle 100, which communicates with a remote controller 220 via a wireless network 225. The aerial vehicle 100 in this example is shown with a housing 130 and arms 135 of an arm assembly. In addition, this example embodiment shows a rotor 140 coupled with the end of each arm 135 of the arm assembly, a gimbal 110, and a camera 120.

The aerial vehicle 100 communicates with the remote controller 220 through the wireless network 225. The remote controller 220 may be a dedicated remote controller or may be another computing device such as a laptop, smartphone, or tablet that is configured to wirelessly communicate with and control the aerial vehicle 100. In one embodiment, the wireless network 225 may be a long range wireless communication system, for example, a long range Wi-Fi system. It also may include or be another wireless communication system, for example, one based on long term evolution (LTE), 3G, 4G, or 5G mobile communication standards. The wireless network 225 may include a unidirectional RC channel used for communication of controls from the remote controller 220 to the aerial vehicle 100 and a separate unidirectional channel used for video downlink from the aerial vehicle 100 to the remote controller 220 (or to a video receiver where direct video connection may be desired).

The remote controller 220 in this example includes a first control panel 250 and a second control panel 255, an ignition button 260, a return button 265 and a screen 270. The first control panel, e.g., control panel 250, may be used to control the vertical direction (e.g. lift and landing) of the aerial vehicle 100. The second control panel, e.g., control panel 255, may be used to control the horizontal direction of the aerial vehicle 100. Each control panel 250, 255 may be structurally configured as a joystick controller and/or touch pad controller. The ignition button 260 may be used to start the rotary assembly (e.g., start the propellers 145). The return button 265 can be used to override the controls of the remote controller 220 and transmit instructions to the aerial vehicle 100 to return to a predefined location. The ignition button 260 and the return button 265 can be mechanical and/or solid state press sensitive buttons.

In addition, the ignition button 260 and the return button 265 may be illuminated with one or more light emitting diodes (LED) to provide additional details. For example the LED may switch from one visual state to another to indicate with respect to the ignition button 260 whether the aerial vehicle 100 is ready to fly (e.g., lit green) or not (e.g., lit red) or whether the aerial vehicle 100 is now in an override mode on a return path (e.g., lit yellow) or not (e.g., lit red). It also is noted that the remote controller 220 may include other dedicated hardware buttons and switches and those buttons and switches may be solid state buttons and switches. For example, a button or switch may be configured to allow for triggering a signal to the aerial vehicle 100 to immediately execute a landing operation and/or a return to designated location.

The remote controller 220 may also include hardware buttons or other controls that control the gimbal 110. The remote controller 220 may allow it's user to change the preferred orientation of the camera 120. In some embodiments, the preferred orientation of the camera 120 may be set relative to the angle of the aerial vehicle 100. In another embodiment, the preferred orientation of the camera 120 may be set relative to the ground.

The remote controller 220 also may include a screen 270 (or display) which provides for visual display. The screen 270 may be a touch sensitive screen. The screen 270 also may be, for example, a liquid crystal display (LCD), an LED display, an organic LED (OLED) display, and/or a plasma screen. The screen 270 may allow for display of information related to the remote controller 220, such as menus for configuring the remote controller 220 or remotely configuring the aerial vehicle 100. The screen 270 also may display images or video captured from the camera 120 coupled with the aerial vehicle 100, wherein the images and video are transmitted to the remote controller 220 via the wireless network 225. The video content displayed on the screen 270 may be a live feed of the video or a portion of the video captured by the camera 120. It is noted that the video content may be displayed on the screen 270 within a short time (e.g., fractions of a second) of being captured by the camera 120.

The video may be overlaid and/or augmented with other data from the aerial vehicle 100 such as the telemetric data from a telemetric subsystem of the aerial vehicle 100. The telemetric subsystem may include navigational components, such as a gyroscope, an accelerometer, a compass, a global positioning system (GPS), and/or a barometric sensor. In one example embodiment, the aerial vehicle 100 may incorporate the telemetric data with video that is transmitted back to the remote controller 220 in real time. The received telemetric data may be extracted from the video data stream and incorporate into predefine templates for display with the video on the screen 270 of the remote controller 220. The telemetric data also may be transmitted separate from the video from the aerial vehicle 100 to the remote controller 220. Synchronization methods such as time and/or location information may be used to synchronize the telemetric data with the video at the remote controller 220. This example configuration may allow a user, e.g., operator, of the remote controller 220 to see where the aerial vehicle 100 is flying along with corresponding telemetric data associated with the aerial vehicle 100 at that point in the flight. Further, if the user is not interested in telemetric data being displayed real-time, the data may still be received and later applied for playback with the templates applied to the video.

The predefine templates may correspond with "gauges" that provide a visual representation of speed, altitude, and charts, e.g., as a speedometer, altitude chart, and a terrain map. The populated templates, which may appear as gauges on the screen 270 of the remote controller 220, may further be shared, e.g., via social media, and or saved for later retrieval and use. For example, a user may share a gauge with another user by selecting a gauge (or a set of gauges) for export. Export may be initiated by clicking the appropriate export button, or a drag and drop of the gauge(s). A file with a predefined extension may be created at the desired location. The gauge may be selected and be structured with a runtime version of the gauge. The gauge may also be played back through software that can read the file extension.

Removable Battery

In some embodiments, the aerial vehicle 100 contains one or more removable batteries. A removable battery, as used herein, may refer to both the electrochemical device used to store chemical energy in one or more cells and to the mechanical structure, e.g., the housing surrounding the electrochemical device and/or an assembly to mechanically couple to the aerial vehicle 100. In some embodiments, the battery may be rechargeable. The housing may include electrical contacts, which allows the aerial vehicle 100 to receive power from the battery. The housing may also include electrical contacts which allow for charging the battery. In some embodiments, the contacts used to discharge the battery during operation of the aerial vehicle 100 may be the same contacts used to recharge the battery. The electrical contacts may also be used to communicate with the aerial vehicle 100. This communication may allow the aerial vehicle 100 to receive an indication of the current charge of the battery or allow the aerial vehicle 100 to authenticate the battery via an authentication protocol. The housing of the battery may also contain mechanisms for mechanically coupling to the aerial vehicle 100 and/or mechanisms for assisting the user in attaching or detaching the battery to or from the aerial vehicle 100. Herein, three types of removable batteries are illustrated: a pull-bar battery, a lever assembly battery, and a latch battery.

Figure 3A:
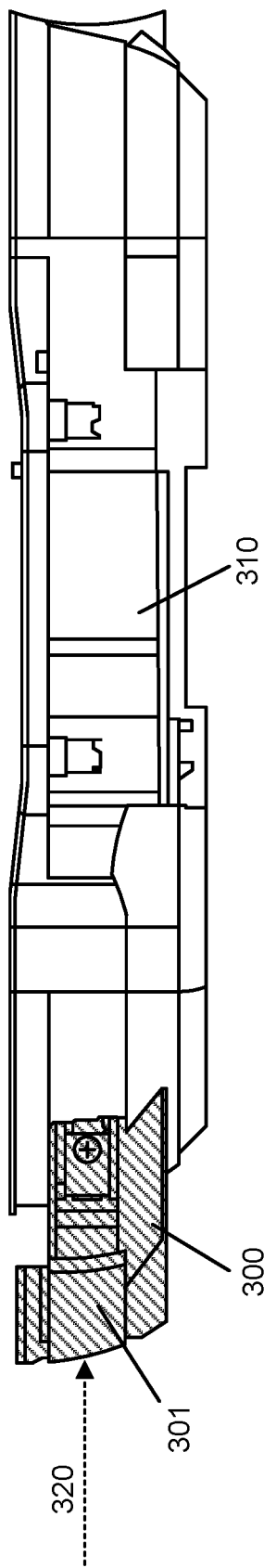
FIG. 3A and FIG. 3B illustrate an example of a pull-bar battery and a chassis of an aerial vehicle.
Figure 3B:
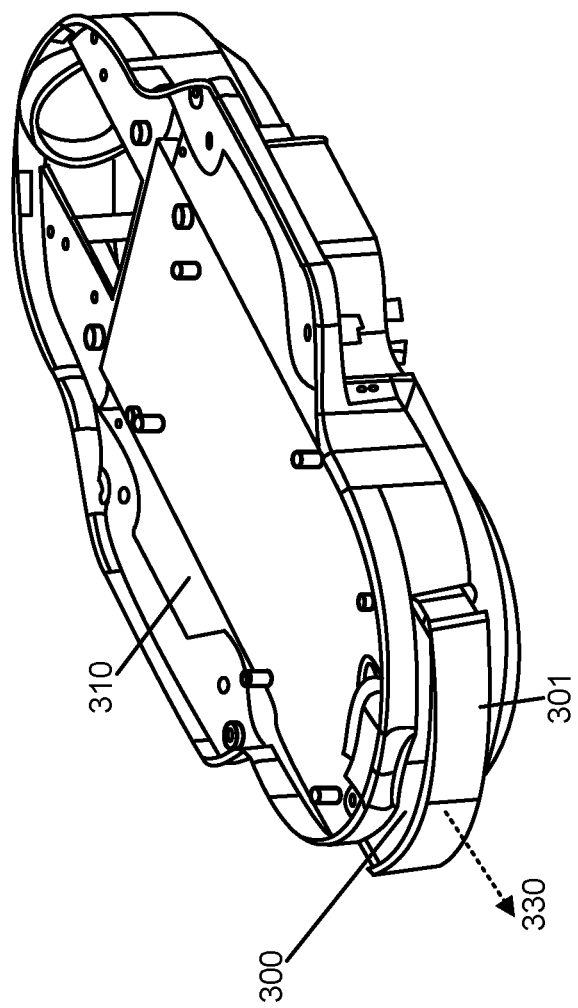

FIGS. 3A-3B depict an example embodiment of a pull-bar battery 300 and the chassis 310. The chassis 310 may be part of the aerial vehicle 100 and may provide a cavity within which the pull-bar battery mechanically couples. The pull-bar battery 300 may include a pull-bar 301 which may assist the user in removing the pull-bar battery 300. The chassis 310 may be part of the housing 130 of the aerial vehicle 100. FIG. 3A illustrates a right side view of the pull-bar battery 300 partially removed from the chassis 310 with the pull-bar 301 contracted. The arrow 320 in FIG. 3A illustrates the direction in which the user may push the pull-bar battery 300 when attaching the pull-bar battery 300 to the chassis 310. In some example embodiments, the pull-bar 301 may be flush with the pull-bar battery 300 and/or the chassis 310 when contracted.

FIG. 3B illustrates a rear, top, and right view of the pull-bar battery 300 coupled to the chassis 310 with the pull-bar 301 extended. The arrow 330 in FIG. 3B illustrates the direction that a user may pull on the pull-bar 301 to first extend the pull-bar 301 and then to remove the pull-bar battery 300 from the chassis 310. In some embodiments, the pull-bar battery 300 may be removed (or decoupled) in one continuous motion simply by pulling on the pull-bar 301. In some example embodiments, the pull-bar battery 300 couples to the chassis 310 by friction. In other example embodiments, when inserted completely into the chassis 310, the pull-bar battery 300 may be locked into place by a latch or a set of latches on the chassis 310. The latch or latches may couple to corresponding hardware on the pull-bar battery 300. In some embodiments, the pull-bar battery 300 may include a latch which couples with a corresponding mechanism in the chassis 310. One or more latches on the pull-bar battery 300 and/or on the aerial vehicle 100 may be disengaged by extending the pull-bar 301, thus enabling the pull-bar battery 300 to be removed. It will be apparent to one skilled in the art that alternate locking mechanism may be used in place of a latch. The pull-bar 301 may function to unlock the pull-bar battery 300 from the chassis 310 as well as a handle to make removal of the pull-bar battery 300 easy for a user. The pull-bar 301 may make removable of the pull-bar battery 300 easier by operating as a handle for the user to grab when removing the battery. This may assist the user in removing a depleted or partially-depleted pull-bar battery 300 that would otherwise be difficult to remove in cases in which the pull-bar battery 300 has swelled or warped while being discharged.

Figure 4:
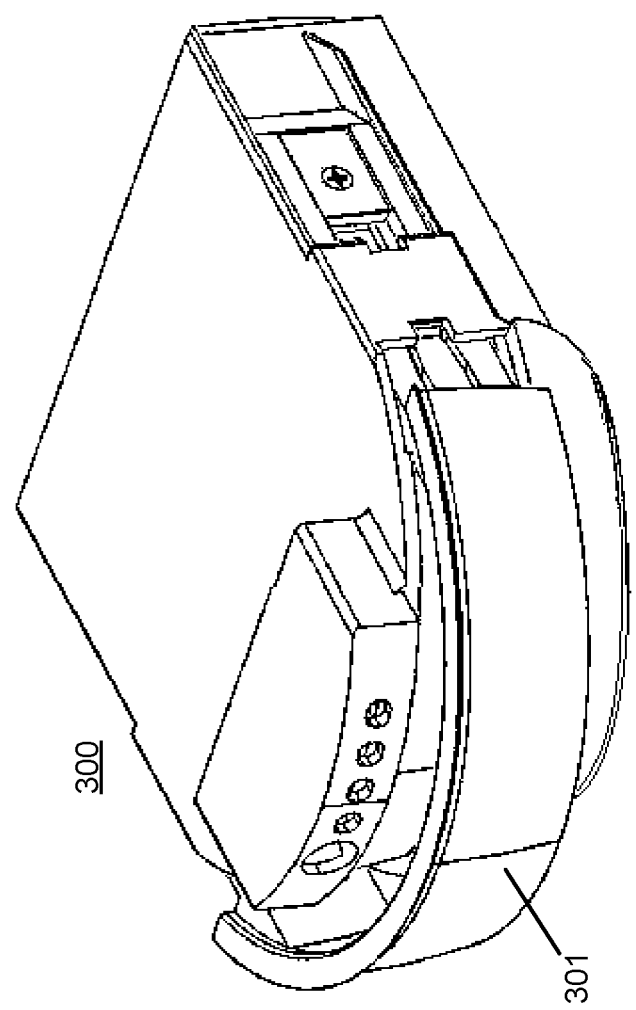
FIG. 4 illustrates an example of a pull-bar battery.
Figure 5:
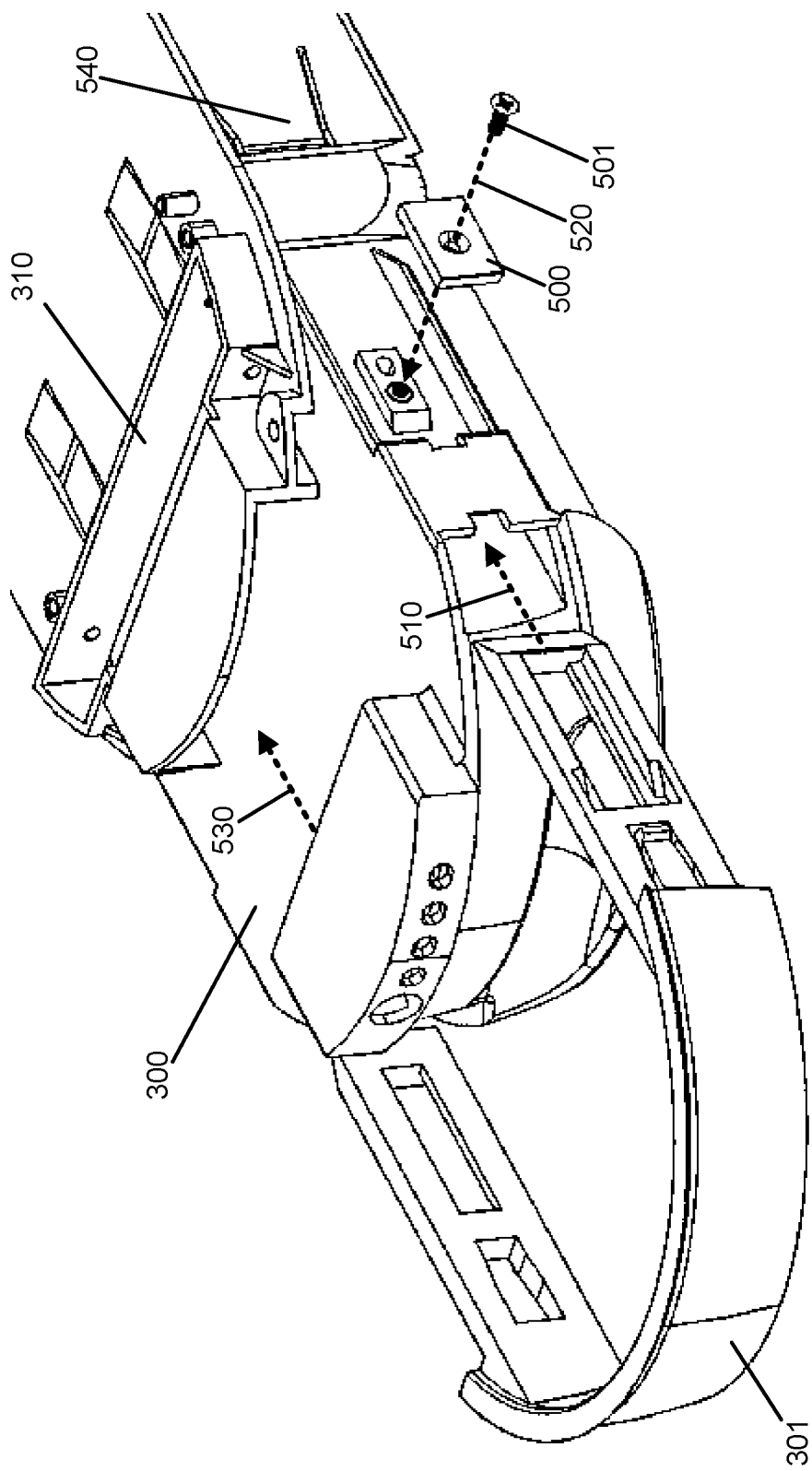
FIG. 5 illustrates an exploded view of a pull-bar battery and a chassis of an aerial vehicle.

FIG. 4 and FIG. 5 illustrate a pull-bar battery 300 according to some example embodiments. FIG. 4 illustrates a pull-bar battery 300 in isolation that includes the characteristic pull-bar 301. FIG. 5 illustrates an exploded view of the pull-bar battery 300, partially inside the chassis 310 of the aerial vehicle 100. In FIG. 5, the pull-bar 301, a tab 500, and a screw 501 are shown detached from the rest of the pull-bar battery 300 for illustrative purposes. The arrows 520 illustrate the way in which the pull-bar 301, a tab 500, and a screw may be assembled together. The arrow 530 illustrates how the pull-bar battery 300 may couple to the chassis 310. Specifically, the pull-bar battery 300 may be inserted into the battery cavity formed by the chassis 310 to couple within the aerial vehicle 100. In one example embodiment, the pull-bar 301 may be configured so that when it is pushed into the chassis 310 portion, a handle edge of the pull-bar battery 300 is substantially flush with a frame of the aerial vehicle 100.

The chassis 310 may include a battery locking spring 540 which locks the pull-bar battery 300 in the chassis 310. In some embodiments, when the pull-bar 301 is compressed, the battery locking spring 540 may prevent the pull-bar battery 300 from being removed. When the pull-bar 301 is compressed, a protruding element on the battery locking spring 540 may be adjacent to the tab 500 of the pull-bar battery 300, thereby preventing the pull-bar battery 300 from being removed. That is, the contact between the tab 500 and the battery locking spring 540 may block the pull-bar battery 300 from being removed from the chassis 310. When the pull-bar 301 is sufficiently extended away from the chassis 310, the protruding element of the battery locking spring 540 may be pushed away from the tab 500 by a slanted surface on the pull-bar 301, thus unlocking the pull-bar battery 300 from the chassis 310. In this way, the pull-bar battery 300 may be locked into place by the battery locking spring 540 when the pull-bar 301 is compressed and may be unlocked (i.e., removable/decoupled) when the pull-bar 301 is extended. Similar locking mechanisms known to one skilled in the art which can be unlocked by extending the pull-bar 301 also may be used to couple the pull-bar battery 300 to the chassis 310.

Figure 6A:
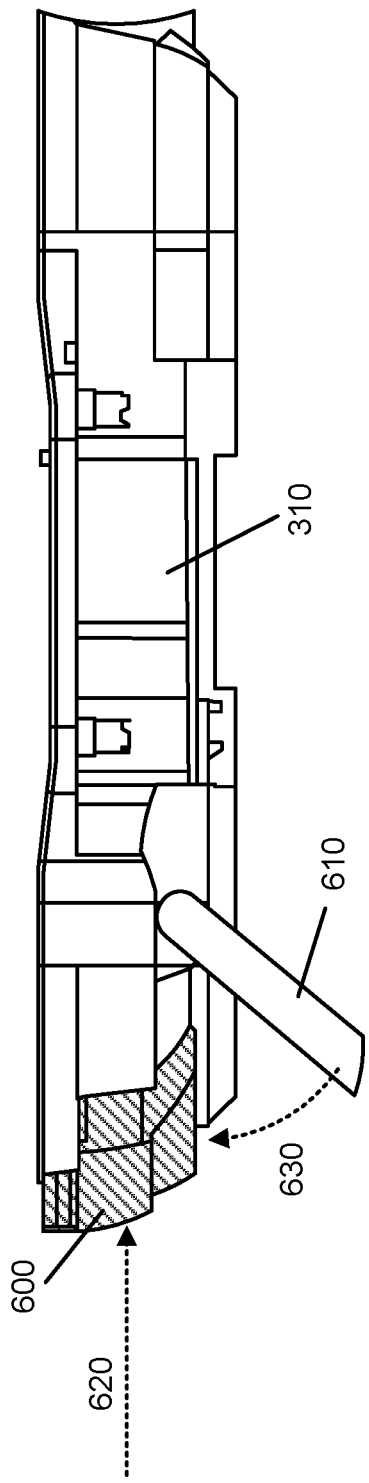
FIG. 6A and FIG. 6B illustrate an example of a removable battery and a chassis of an aerial vehicle with a lever assembly.
Figure 6B:
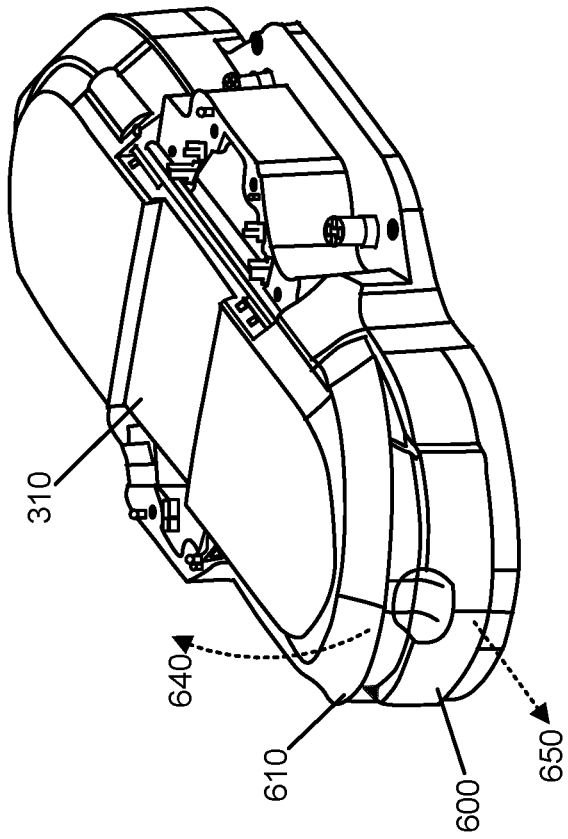

FIG. 6A and FIG. 6B illustrate an example embodiment of a removable battery that may be coupled and removed, by a lever assembly, from the battery cavity formed by the chassis coupled with the aerial vehicle 100. FIG. 6A illustrates a right side view of a removable battery 600 and a chassis 310 with a lever 610. The lever 610 is shown in an open position in FIG. 6A. The removable battery 600 couples with the chassis 310.

In order to couple the removable battery 600 with the chassis 310, a user may push the removable battery 600 into a cavity of the chassis 310 in the direction indicated by arrow 620 and then pull the lever 610 towards the underside of the chassis 310 in the direction indicated by arrow 630. In some embodiments, the lever 610 may operate a locking mechanism, which locks the removable battery 600 into the chassis 310 of the aerial vehicle 100. This locking mechanism may be such that the removable battery 600 is locked into the chassis 310 when the lever 610 is closed and unlocked from the chassis 310 (i.e., able to be removed) when the lever 610 is open. In some example embodiments, pushing the removable battery 600 into the cavity in the chassis 310 may cause the lever 610 to be closed. Thus, only a single action may be required by the user to insert the removable battery 600 and lock it into place. In an alternate embodiment, the user inserting the removable battery 600 into the corresponding cavity in the chassis 310 may not close the lever 610, and the lever 610 may need to be closed by a separate action of the user.

FIG. 6B illustrates a rear, bottom, and left view of an embodiment of the removable battery 600 shown in FIG. 6A in which the lever 610 is nearly closed and where the removable battery 600 is fully inserted into the corresponding cavity in the chassis 310 of the aerial vehicle 100. In order to remove (or decouple) the removable battery 600 from the chassis 310, the lever 610 may be pulled away from underside of the chassis 310 in the direction indicated by the arrow 640, which may unlock the removable battery 600 from the chassis 310. The removable battery 600 may then be removed by pulling it the direction indicated by the second arrow 650—down and away from a bottom of the chassis 310. In some embodiments, pulling the lever 610 away from the underside of the chassis 310 when removing the removable battery 600 may also move the removable battery 600 in the direction indicated by the second arrow 650. A user may subsequently remove the removable battery 600 by pulling in the direction of the second arrow 650 away from the chassis 310. The mechanical advantage provided by the lever 610 may make removing the removable battery 600 significantly easier. This mechanical advantage may assist the user in removing a depleted or partially-depleted removable battery 600 that would otherwise be difficult to remove in cases in which the removable battery 600 has swelled or warped while being discharged.

Figure 7A:
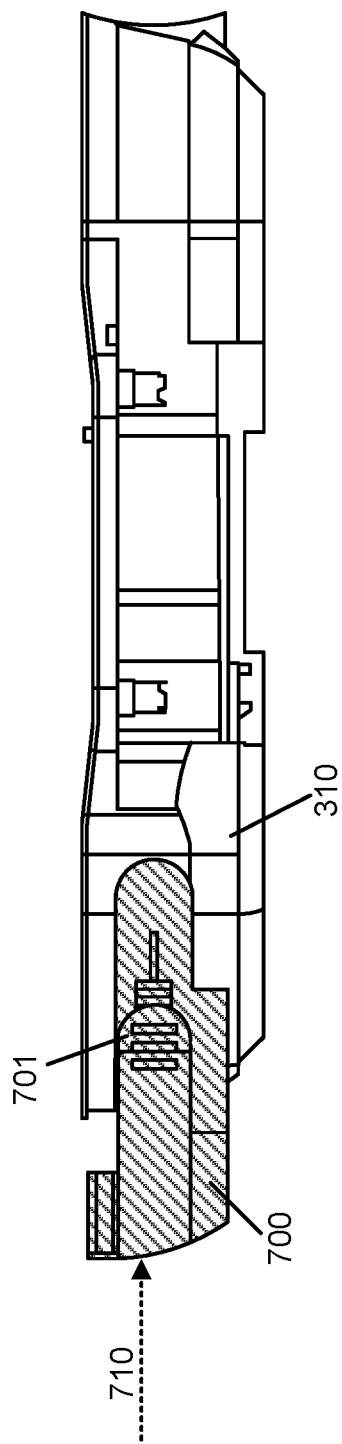
FIGS. 7A and 7B illustrate an example of a latch battery and a chassis of an aerial vehicle.
Figure 7B:
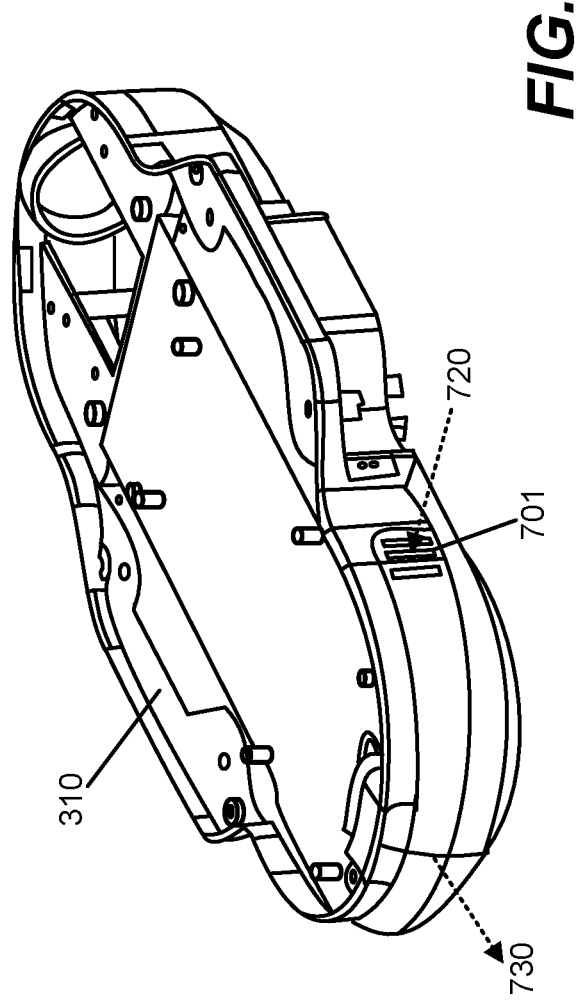

FIG. 7A and FIG. 7B illustrate an embodiment of a removable battery that may be coupled and removed from the aerial vehicle 100 by a latch or "squeeze open" assembly. FIG. 7A illustrates a left side view of the latch battery 700 and chassis 310. In the embodiment illustrated in FIG. 7A, the latch battery 700 is shown partially inside the corresponding cavity of the chassis 310. FIG. 7B illustrates a rear, top, and right view of the chassis 310 and latch battery 700. The chassis 310 may be part of the aerial vehicle 100. The chassis 310 may have a cavity within with the latch battery 700 may be mechanically inserted and couple with the aerial vehicle 100 to provide power to the aerial vehicle 100.

The latch battery 700 may include buttons 701 which may be used to decouple the latch battery 700 and the chassis 310. The latch battery 700 may be coupled to the chassis 310 by pushing the latch battery 700 in the direction indicated by the arrow 710. Once the latch battery 700, is fully inserted into the cavity in the chassis 310, a locking mechanism may be triggered. The latch battery 700 may be removed by pressing on the buttons 701 as depicted by the arrow 720 while simultaneously pulling the latch battery 700 in the direction indicated by the arrow 730.

These various embodiments of batteries may allow a battery to be quickly attached to and/or removed from an aerial vehicle 100. The various embodiments described above may also securely attach the battery to the aerial vehicle 100.

Detachable Propeller

The propeller blades of an aerial vehicle 100, such as a quadcopter, are often susceptible to damage due to their light weight and high rate of rotation. Thus, it may be advantageous to provide for easily replaceable propellers.

FIG. 8, FIG. 9A, FIG. 9B, and FIG. 10 illustrate example embodiments of removable propellers and corresponding propeller locking mechanisms which may allow for quick replacement of a propeller without the use of tools. A removable propeller and propeller locking mechanism may couple together as a propeller coupling assembly. The propeller coupling assembly may permit the propeller to be detached from and/or coupled to the aerial vehicle 100 without the use of tools. The propeller coupling assembly may lock the propeller into place and may be configured to prevent the propeller from accidently detaching from propeller locking mechanism.

Figure 8:
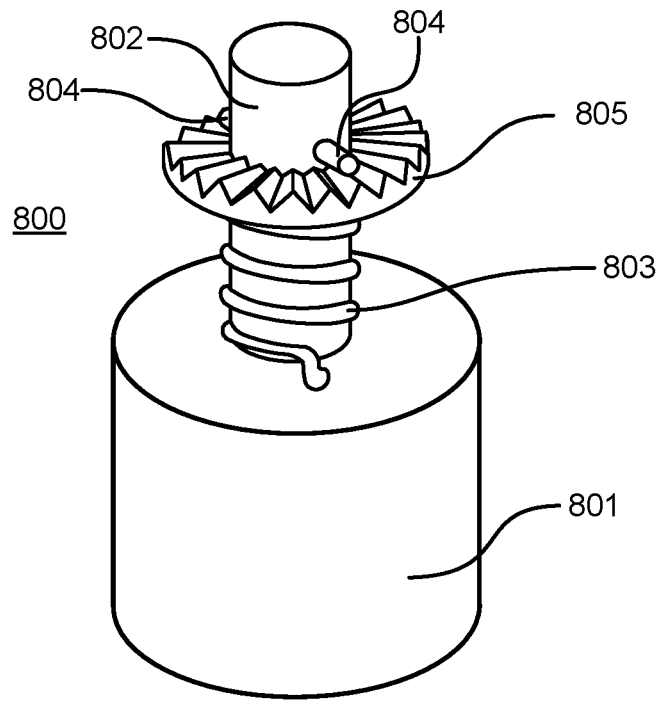
FIG. 8 illustrates an example of a propeller locking mechanism.

FIG. 8 illustrates an embodiment of a propeller locking mechanism 800. The propeller locking mechanism 800 may include a base 801, a shaft 802, a spring 803, a one or more pins 804, and/or a toothed plate 805. The base 801 may be rigidly coupled to the shaft 802, which may in turn be rigidly coupled to the one or more pins 804. One end of the spring 803 may be attached to the base 801 and/or the shaft 802 and the other end may be attached to the toothed plate 805. The base 801 may be rigidly coupled to the shaft 802 so as to comprise a single shaft. The toothed plate 805 may include a plurality of teeth that provide adjacent ridges and valleys to which a reciprocal element of a propeller 145 may couple. The teeth of the toothed plate 805 may be located on the side of the toothed plate 805 opposite the base 801 (i.e., the teeth may face away from the base 801). The shaft 802 may pass through the toothed plate 805 and the toothed plate 805 may be able to move up and down, along the axis of the shaft 802. Vertical translation and/or rotation of the toothed plate 805 may cause the spring 803 to deform, e.g., compress, thus exerting an upward force on the toothed plate 805. The shaft 802 and/or the base 801 may be coupled to a rotor (e.g., rotor 140) of the aerial vehicle 100. The rotor 140 may rotate a propeller by rotating the shaft 802.

Figure 9A:
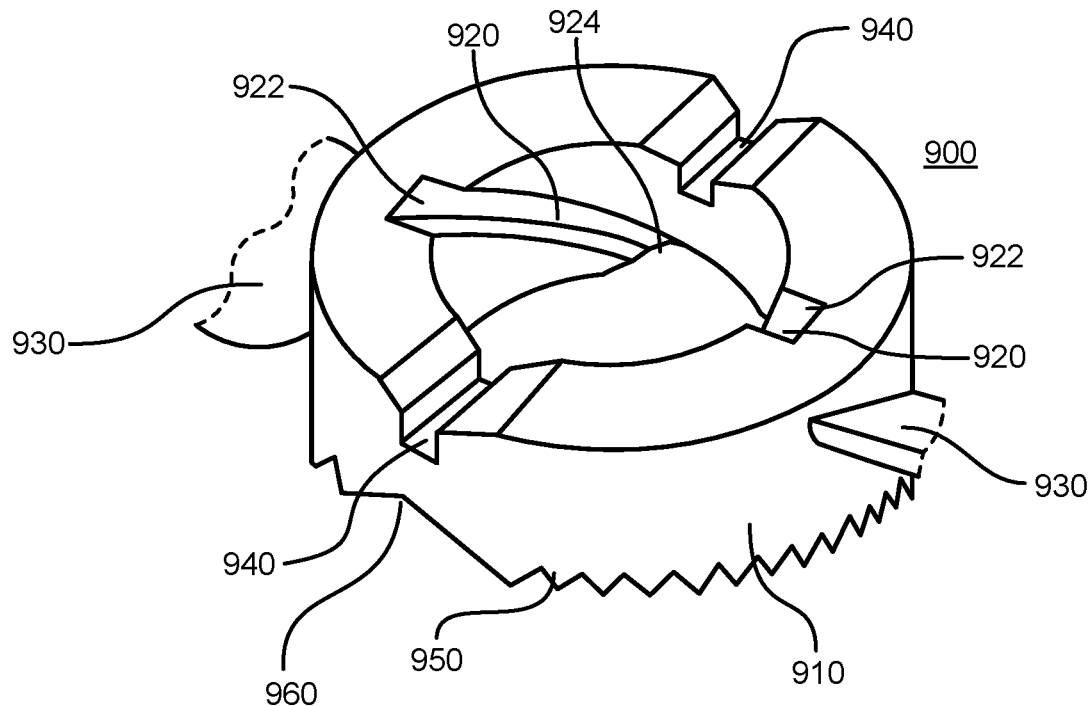
FIG. 9A and FIG. 9B illustrate an example of a removable propeller.
Figure 9B:
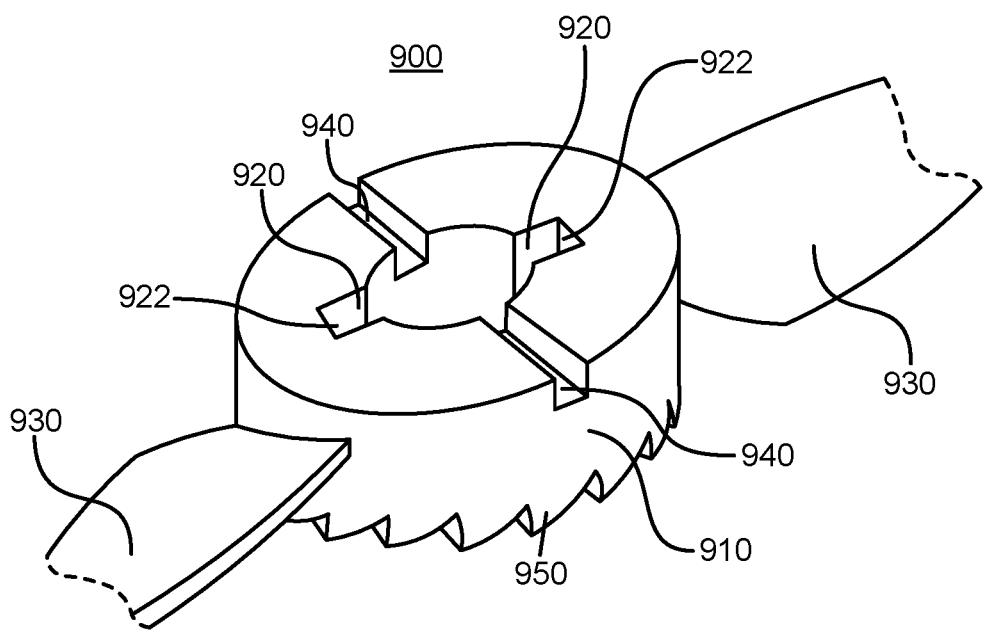

FIG. 9A and FIG. 9B illustrate example embodiments of a propeller 900, which may couple to the propeller locking mechanism 800 illustrated in FIG. 8. The propeller 900 may be an embodiment of a propeller 145. The propeller 900 may include a propeller hub 910 coupled to one or more propeller blades 930. Only portions of the propeller blades 930 are shown in FIGS. 9A and 9B, as illustrated by the broken lines. The propeller hub 910 may include one or more locking slots 940, one or more grooves 920, and one or more lead-in chamfers 960.

The propeller hub 910 may include an aperture with a first opening at a first end (e.g., the top of the propeller hub 910) and a second opening at the second end (e.g., the bottom of the propeller hub 910). The first opening and the second opening may be connected by an internal surface. The internal surface may be an open cylinder in which the openings of the cylinder are the first and second openings of the propeller hub 910. The one or more grooves 920 may be on the internal surface. The one or more grooves 920 may each include a first groove opening 922 at the first end of the propeller hub 910 and a second groove opening 924 at the second end of the propeller hub 910. The first groove openings 922 of the one or more grooves 920 may be part of the first opening of the aperture of the propeller hub 910. Similarly, the second groove openings 924 of the one or more grooves 920 may be part of the opening of the second opening of the aperture of the propeller hub 910. In some example embodiments, a second groove opening 924 is formed in a lead-in chamfer 960 formed on the second end of the propeller hub 910. The lead-in chamfer 960 may include two slanted edges that form an indent in the second end of the propeller hub 910. The peak of the lead-in chamfer 960 may be co-located with the opening of the second opening 924 of a respective groove 920.

The one or more locking slots 940 and the one or more grooves 920 may be formed as indents in the propeller hub 910 (e.g., on the first end of the propeller hub 910). In some example embodiments, the one or more locking slots 940 form a chamfered edge with the first end of the propeller hub 910 as illustrated in FIG. 9A. The one or more grooves 920 may be on the interior of the propeller hub 910 (e.g., the grooves 920 may run along the internal surface of the propeller hub 910). In some example embodiments, the grooves 920 may rotate around an axis concentric with the internal surface of the propeller hub 910, as illustrated in FIG. 9A. In some embodiments, the grooves 920 may be parallel with the axis of the internal surface in the propeller hub 910, as illustrated in FIG. 9B. The propeller hub 910 may be in the shape of a cylindrical shell as illustrated in FIGS. 9A and 9B. The propeller hub 910 may be rigidly attached to the one or more propeller blades 930. The propeller hub 910 and the propeller blades 930 may be elements of the same material body. The propeller hub 910 may have a toothed bottom 950 that includes a plurality of teeth that provide adjacent ridges and valleys that may reciprocally couple to (and decouple from) the toothed plate 805 of the propeller locking mechanism 800.

The propeller hub 910 may fit around the shaft 802 of the propeller locking mechanism 800. In order to lock the propeller 900 to the propeller locking mechanism 800, a user may place the propeller hub 910 of the propeller 900 over the shaft 802 so that the shaft 802 is aligned with the aperture of the propeller hub 910. The pins 804 on the shaft 802 may block the propeller hub 910 from being pressed down unless the second groove openings 924 at the second end (e.g., the bottom) of the propeller hub 910 corresponding to the bottom ends of the grooves 920 are properly aligned with the pins 804. The pins 804 may fit into the grooves 920. By pressing down on the propeller 900 and rotating it, the propeller hub 910 may be moved past the pins 804 by running the pins 804 through the grooves 920 on the interior of the propeller hub 910. In example embodiments in which the second groove openings 924 of the propeller hub 910 are formed in lead-in chamfers 960, the lead-in chamfers 960 may make the user's task of aligning the second groove openings 924 with the pins 804 easier.

In some example embodiments, while the pins 804 enter the second openings 924 of the grooves 920 and/or enter the lead-in chamfer 960, the toothed bottom 950 of the propeller hub 910 may come into contact with the toothed plate 805. In alternate example embodiments, the toothed bottom 950 of the propeller hub 910 may come into contact with the toothed plate 805, while the pins 804 are being passed through the grooves 920. The toothed bottom 950 of the propeller hub 910 and the teeth on the top of the toothed plate 805 may reciprocally mesh together. As the propeller 900 is pressed down and rotated, the toothed plate 805 that is meshed to it may move down and rotate as well. Accordingly, as the propeller 900 is pushed down by the user, the spring 803 may cause the toothed plate 805 to exert a vertical restoring force on the propeller 900. The teeth of the toothed plate 805 may mesh with those on the propeller hub 910 forming a Hirth joint.

Once the pins 804 have passed completely through the grooves 920 by passing through the first groove openings 922 of the grooves 920, the user may maneuver the pins out of the grooves 920 so that the pins 804 are above the propeller 900. The user may align the locking slots 940 on the propeller 900 with the pins 804. The one or more locking slots 940 may have the same widths as the one or more grooves 920, because the one or more locking slots 940 couple with the one or more pins which pass through the one or more grooves 920. In some embodiments, torsion on the spring 803 may cause the locking slots 940 to align with the pins 804, mitigating the need for the user to align the pins 804 and locking slots 940. In some example embodiments, once the pins 804 have passed completely through the grooves 920 by passing through the first groove openings 922, the spring 803 may exert a rotational restoring force on the propeller hub 910 causing the propeller hub 910 to rotate so that the pins 804 align with the locking slots 940. In this way, the locking slots 940 of the propeller hub 910 may align with the pins 804 and the propeller hub 910 may lock into place when a user releases the propeller 900. The vertical force exerted by the spring 803 may hold the propeller 900 in place by pushing the locking slots 940 into the pins 804. Thus, when the pins 804 are in the locking slots 940 of the propeller 900, the propeller 900 may be locked to the propeller locking mechanism 800.

In some example embodiments, each of the pins 804 may be held at a first position by springs which are internal to the shaft 802 so that the pins 804 extend a first distance from the shaft 802. When a force is applied to the pins 804, such as when a user presses down on the pins 804, the pins 804 may be pushed into the shaft 802 by compressing and/or extending the springs attached to the pins 804. In some example embodiments, the groove 920 in the propeller 900 may be shallower at the top of the propeller 900 than at the bottom.

A groove 920 may be deep enough at the base of the propeller 900 so that a pin 804 can fit into the groove 920 without being pushed down, but may be too shallow at the top of the propeller for a pin 804 to fit into the groove without the pin 804 being pressed down. In such an embodiment, the user may not need to press down the pins 804 in order to attach the propeller 900 to the propeller locking mechanism 800—the pins 804 may be pressed down as the propeller 900 is twisted onto the propeller locking mechanism 800 and the grooves 920 becomes gradually shallower. However, the pins 804 may need to be pressed down in order to remove the propeller 900. This example embodiment may help prevent the propeller 900 from being inadvertently removed from the propeller locking mechanism 800 even if the pins 804 fall out of the locking slots 940. In other example embodiments, the grooves 920 may be of uniform depth. In those example embodiments, the pins 804 may need to be pressed down in order to attach and to remove the propeller 900. In some example embodiments the pins 804 are fixed (e.g., the pins 804 are not attached to springs and cannot be pushed down and thus the pins 804 extend a set length from the shaft 802). It is not required that the propeller locking mechanism 800 includes only two pins 804—any number of pins 804 may be used. Also, the propeller locking mechanism 800 may include an element of any shape that extends from the shaft 802 in place of a pin 804. Furthermore, in some example embodiments, the propeller 900 may include one or more pins on the internal surface of the cylindrical shell and the propeller locking mechanism 800 may include corresponding grooves on the shaft 802.

Figure 10:
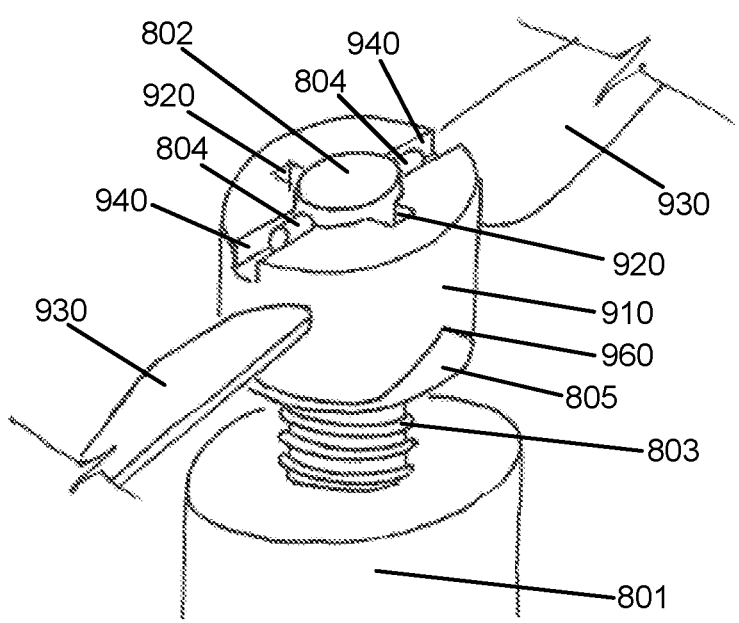
FIG. 10 illustrates an example of a removable propeller coupled to a propeller locking mechanism.

FIG. 10 illustrates an example embodiment of a propeller coupling assembly including a propeller 900 locked into a propeller locking mechanism 800. The embodiment shown in FIG. 10 is similar to the embodiments shown in FIG. 8, FIG. 9A, and FIG. 9B, in that attaching the propeller 900 to the propeller locking mechanism 800 may involve manipulating the propeller 900 so that the pins 804 pass through the grooves 920 of the propeller 900 and then rotating the propeller 900 so that pins 804 couple into the locking slots 940. The spring 803 may push the propeller 900 upward so that it stays locked in place. In the embodiment illustrated in FIG. 10, the interconnecting teeth on the propeller hub 910 of the propeller 900 and the toothed plate 805 of the propeller locking mechanism 800 are different than those illustrated in FIGS. 8, 9A, and 9B. The example embodiment of FIG. 10 is illustrated with two teeth (only the first tooth can be seen in FIG. 10), where each tooth is reciprocal with a respective lead-in chamfer 960 of the propeller hub 910. It will be apparent to one skilled in the art that any number and/or manner of teeth or keying mechanisms may be used to connect the propeller hub 910 to the propeller locking mechanism 800 and to transfer torque from the propeller locking mechanism 800 to the propeller 900 during operation of the rotor 140. The interconnecting teeth or keying mechanism may be such that when the propeller 900 is locked into the propeller locking mechanism 800, the spring 803 exerts no torque on the propeller 900 (i.e., the deforming forces on the spring 803 exerted by the attachments of the spring 803 to the toothed plate 805 and the base 801 are purely compressive and produce no torque), when the rotor 140 is not in operation. In some embodiments, a sleeve coupling assembly, a key and keyset pair, a spline coupling assembly, and/or some other type of coupling assembly may be used in place of the toothed bottom 950 of the propeller hub 910 and the toothed plate 805.

In some example embodiments, the toothed plate 805 may be held at an equilibrium position when the propeller 900 is not attached. During the process of attaching the propeller 900, while the pins 804 are in the grooves 920, the toothed plate 805 may come into contact with the toothed bottom 950 of the propeller hub 910. The equilibrium position of the toothed plate 805 may be such that the rotation of the propeller 900 with the respect of the shaft 802 when this contact occurs will be the same relative rotation at which the propeller 900 is locked into the propeller locking mechanism 800. For example, in the embodiment illustrated in FIG. 9A, the bottom of each groove 920 is directly opposite a respective locking slots 940. That is, the bottom of each groove 920 is directly under a respective locking slot 940. Thus, if the spring 803 holds the toothed plate 805 at an equilibrium position so that the propeller 900 and the toothed plate 805 make contact when the pins 804 are near the bottom of the grooves 920, then when the pins 804 are in the locking slots 940, the propeller 900 will be at roughly the same orientation as when the toothed plate 805 first came into contact with the teeth of the propeller hub 910. Because the spring 803 may be free of torsion when the toothed plate 805 is held at an equilibrium position, the spring 803 likewise may be free of torsion when the propeller 900 and the propeller locking mechanism 800 are locked together. Furthermore, because the position of the locking slots 940 correspond the position at which the spring 803 is free of torsion, the spring 803 may align the pins 804 and the locking slots 940 once the pins 804 have passed through the grooves 920, which may make the action of locking the propeller 900 into place easier for a user.

The propeller coupling assembly allows the propeller 900 to removably couple to the propeller locking mechanism 800. The propeller 900 may be quickly and easily attached to or removed from the aerial vehicle 100 without the use of the tools. The force of the toothed plate 805 on the propeller 900 resulting from the compressed spring 803 may keep the one or more pins 804 of the propeller locking mechanism 800 inside the locking slots 940 propeller hub 910. The one or more pins 804 and/or the toothed plate 805 intermeshed with the toothed bottom 950 of propeller hub 910 may transfer a rotational load from the shaft 802 to the propeller 900.

Thermal Vents

Figure 11:
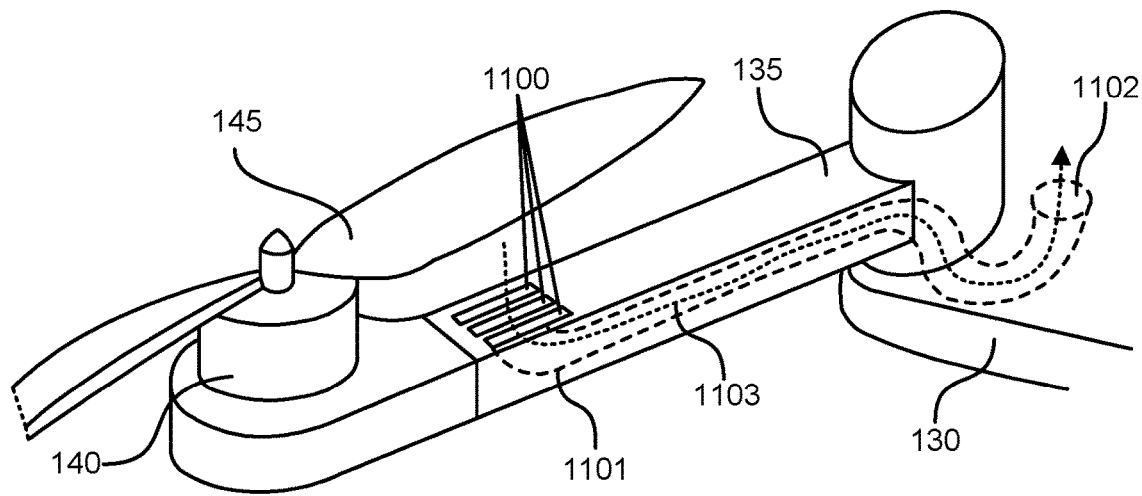
FIG. 11 illustrates an example of vents and an air pathway to cool electronics in the aerial vehicle.
Figure 12:
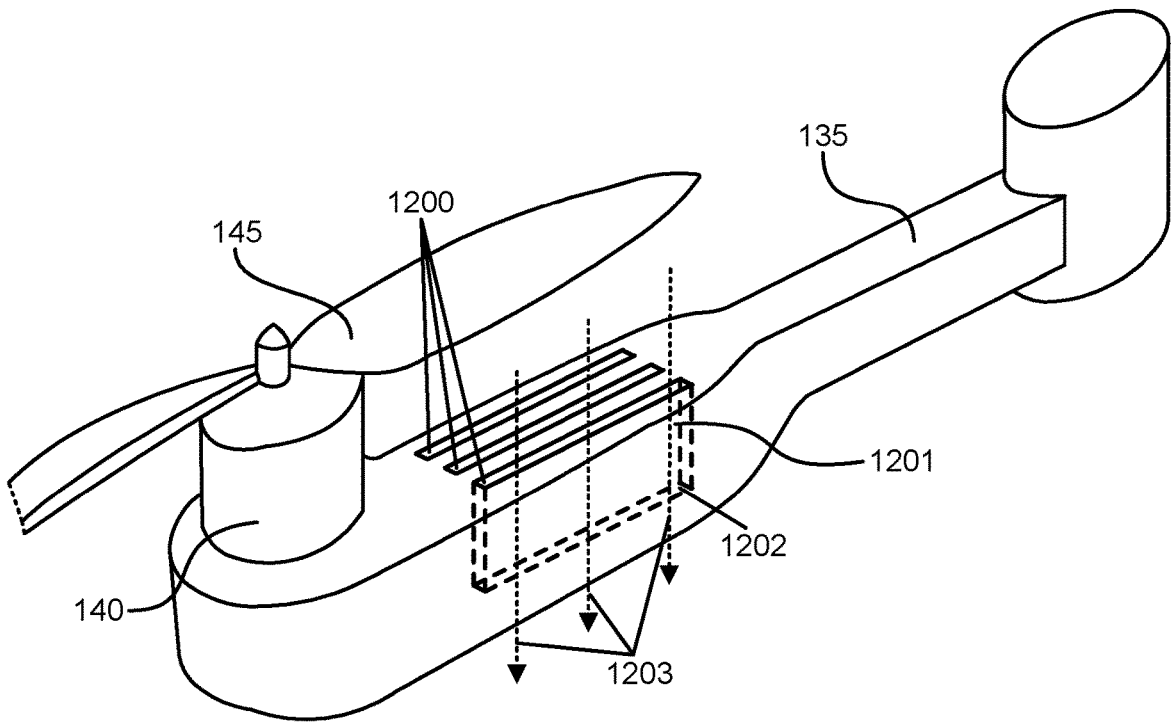
FIG. 12 illustrates an example of vents to cool electronics in the arm of the aerial vehicle.

FIGS. 11 and 12 illustrate two example embodiments in which the arms 135 on the aerial vehicle 100 include vents. The vents may allow for airflow through the arms 135 for cooling of electronics within the aerial vehicle 100. The electronics cooled by the airflow may be the motors that power the propellers, computer processors, and/or a power source for the aerial vehicle 100; e.g., battery or batteries. In some embodiments, the electronics may be near the airflow. In some example embodiments, the electronics may be connected to thermally conductive material, such as a metal wire, and the thermally conductive material may be convectively cooled by the airflow, which, in turn, cools the electronics. In some embodiments, the thermal vents may be coupled with, or integrated with, channels that direct received air to particular portions of the aerial vehicle 100, e.g., where the electronics or power sources are located.

By way of example, in FIGS. 11 and 12 the vents are on the top of the arm 135 underneath the propeller. When the propellers are active, this configuration may increase the airflow 1103 into the vents which may enhance the cooling.

FIG. 11 illustrates an example embodiment with one or more vents 1100, an air pathway 1101 (or channel), and an outlet vent 1102. The embodiment of FIG. 11 may allow for airflow 1103 through the air pathway 1101. The airflow 1103 is illustrated by a dashed-line indicating an air flow path within the air pathway 1101. This airflow 1103 may be used to cool electronics in the arm 135 or in the housing 130 of the aerial vehicle 100. Wires used to transfer power and/or control signals between the housing 130 and the motors in the rotors 140 may be in thermal contact with the airflow 1103. This may allow heat generated by the motor to flow along the wire and be absorbed by the airflow 1103, thus cooling the motor. The airflow 1103 also may be in thermal contact with electronics in the housing such as computer processors, sensors, communication circuits, and/or one or more battery. Thermal contact may comprise direct convective cooling of the electronics and/or convective cooling of a conductor that is in thermal contact with the electronics.

The airflow 1103 of each arm 135 may flow out of a single outlet vent 1102 or out of a plurality of outlet vents 1102. The outlet vent 1102 is depicted in FIG. 11 as being oriented upwards, but in alternate embodiments the outlet vent 1102 may be oriented in some other direction. It is noted that there may be one or more outlet vents 1102 and one or more outlet vents may be directed towards specific components in the housing for which cooling airflow may be desired. The air pathway 1101 may be a connected cavity in the arm 135 and the housing 130, or may be a tube that runs from the vents 1100 to the outlet vent 1102. In FIG. 11, three thin rectangular vents 1100 are depicted, but in alternate embodiments the vents 1100 may vary in number, size, shape, and position.

FIG. 12 illustrates an alternate example embodiment of vents which may allow for airflow through the arms 135 of the aerial vehicle 100. The illustrated embodiment includes three vents 1200, an air pathway 1201, and an outlet vent 1202, the combination of which may allow for airflow 1203 through the air pathway 1201. The airflow 1103 is illustrated by three dashed lines which depict air flow paths. In FIG. 12, only one air pathway 1201 and outlet vent 1202 are illustrated, however it is understood the remaining two vents 1200 likewise may have corresponding air pathways and output vents. The airflow 1203 may cool electronics in the arm and/or electrical components in the rest of the aerial vehicle, if the electrical components are in thermal contact with the airflow 1203 (e.g., through a wire which is convectively cooled by the airflow 1203 and which is connected to the electrical component). Some example embodiments may include a single air pathway 1201 to which every vent 1200 and output vent 1202 is connected. In some example embodiments the arm 135 may be hollow, and the air pathway 1201 is the hollow cavity of the arm 135. In some example embodiments, the arm 135 may include a different number of vents 1200 than is depicted in FIG. 12.

Vents in the arm 135 of an aerial vehicle 100 may provide a reliable means of cooling the aerial vehicle 100 to offset the heat generated by the electronics. Cooling the components of the aerial vehicle 100 may obviate the overheating of processors, sensors, motors, and/or other electronics in the aerial vehicle 100. Placing the vents (e.g., vents 1100 or vents 1200) underneath a propeller 145 may produce greater airflow through air pathways (e.g., air pathway 1101 or air pathway 1201) resulting in active cooling of the aerial vehicle 100 without the need for additional fans and/or heat sinks. In this way, this configuration may help prolong operational use of the aerial vehicle 100 by obviating the need for additional weight from cooling components, such as heat sinks and/or cooling fans.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for the disclosed aerial vehicle and associated systems. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An aerial vehicle comprising:
a housing;
a chassis connected to the housing and configured to provide a cavity;
a battery configured to mechanically couple to the chassis via the cavity;
a pull-bar connected to the battery and movable relative to the battery between a closed position and an open position, wherein the pull-bar in the closed position locks the battery within the housing, wherein when the pull-bar is moved to the open position the pull-bar unlocks the battery, and wherein the pull-bar assists in removing the battery from the chassis;
a locking mechanism comprising a locking spring which locks the battery to the chassis, wherein the locking spring prevents the battery from being removed when the pull-bar is compressed into the closed position; and
a protruding element on the locking spring that is adjacent to a tab of the battery to prevent the battery from being removed when the pull-bar is compressed into the closed position.

2. The aerial vehicle of claim 1, wherein the pull-bar is flush with any of the battery and the chassis when the pull-bar is compressed into the closed position.

3. The aerial vehicle of claim 1, wherein the battery is coupled to the chassis via a locking mechanism that comprises one or more latches that couple the battery to one or more latches of the chassis.

4. The aerial vehicle of claim 1, wherein contact between the tab and the locking spring blocks the battery from being removed from the chassis.

5. The aerial vehicle of claim 1, wherein the protruding element on the locking spring is pushed away from the tab by a slanted surface on the pull-bar as the pull-bar moves relative to the chassis from the closed position towards the open position thereby unlocking the battery from the chassis.

6. The aerial vehicle of claim 1, wherein the battery couples to the chassis via a lever assembly.

7. The aerial vehicle of claim 6, wherein when the battery is inserted into the cavity of the chassis, the lever assembly rotates about a rotational axis to the closed position thereby securing the battery in a single action.

8. The aerial vehicle of claim 1, wherein the battery couples to the chassis via a squeeze open assembly.

9. The aerial vehicle of claim 8, wherein when the battery is inserted into the cavity of the chassis, the squeeze open assembly is activated by pressing on one or more buttons of the squeeze open assembly to release the battery from the chassis.

10. An aerial vehicle battery, comprising:
a pull-bar handle connected to the aerial vehicle battery, wherein the pull-bar handle is movable relative to the aerial vehicle battery so that the pull-bar handle is substantially flush with a frame of an aerial vehicle when the pull-bar handle is moved from an open position to an inserted position; and
a locking mechanism configured to couple the aerial vehicle battery to a chassis of the aerial vehicle when the locking mechanism is activated to prevent the aerial vehicle battery from being removed when the pull-bar handle is in the inserted position, wherein the locking mechanism includes a locking spring with a protruding element that is adjacent to a tab of the aerial vehicle battery to prevent the aerial vehicle battery from being removed when the pull-bar handle is compressed in the inserted position.

11. The aerial vehicle battery of claim 10, wherein the locking mechanism includes a lever assembly that enables the aerial vehicle battery to be secured in a single action of inserting the aerial vehicle battery into the chassis.

12. The aerial vehicle battery of claim 10, wherein the locking mechanism includes a squeeze open assembly.

13. A system, comprising:
an aerial vehicle;
a chassis within the aerial vehicle;
a battery configured to be located within and coupled to the aerial vehicle by the chassis; and
a locking mechanism configured to secure the battery within the aerial vehicle, wherein the locking mechanism comprises:
a pull-bar assembly comprising:
a pull-bar that is movable along a horizontal plane between an open position where the battery is insertable and removable from the chassis and an inserted position where the pull-bar prevents the battery from being insertable or removable from the chassis, wherein the pull-bar comprises a slanted surface that is movable into contact with a locking spring of the locking mechanism to move the locking spring away from the chassis so that the pull-bar is movable to the open position and the battery is removable;

wherein the chassis extends along the horizontal plane with an opening in the chassis being located at an end of the chassis so that the battery extends into the opening of the chassis in a horizontal direction along the horizontal plane.

14. The aerial vehicle battery of claim 10, wherein the pull-bar handle comprises a slanted surface that is movable into contact with the locking spring to move the locking spring away from the tab so that the pull-bar handle is movable to the open position and the aerial vehicle battery is removable.

15. The aerial vehicle of claim 1, wherein the pull-bar comprises:
a slot in communication with the tab so that the tab removably connects the pull-bar to the battery.

16. The aerial vehicle of claim 15, wherein the pull-bar moves relative to the tab and the tab is fixed in position.

17. The aerial vehicle battery of claim 10, wherein the protruding element on the locking spring is pushed away from the tab by a slanted surface on the pull-bar as the pull-bar moves relative to the chassis from the closed position towards the inserted position thereby unlocking the battery from the chassis.

18. The aerial vehicle battery of claim 10, wherein the locking spring is part of the chassis.

19. The system of claim 13, wherein the locking spring is part of the chassis.

20. The system of claim 13, wherein the pull-bar includes a slot and a tab that is connected to the battery and located within the slot so that the pull-bar is movable relative to the battery between the open position and the inserted position.

* * * * *